(12) United States Patent
Bijl

(10) Patent No.: US 11,700,803 B2
(45) Date of Patent: Jul. 18, 2023

(54) CULTIVATION SYSTEM FOR CULTIVATING PLANTS

(71) Applicant: Own Greens Holding B.V., Burgh-Haamstede (NL)

(72) Inventor: John Bijl, Burgh-Haamstede (NL)

(73) Assignee: Own Greens Holding B.V., Burgh-Haamstede (NL)

( * ) Notice: Subject to any disclaimer, the term of this patent is extended or adjusted under 35 U.S.C. 154(b) by 0 days.

(21) Appl. No.: 17/047,093

(22) PCT Filed: Feb. 15, 2019

(86) PCT No.: PCT/NL2019/050101
§ 371 (c)(1),
(2) Date: Oct. 13, 2020

(87) PCT Pub. No.: WO2019/203637
PCT Pub. Date: Oct. 24, 2019

(65) Prior Publication Data
US 2021/0144941 A1    May 20, 2021

(30) Foreign Application Priority Data
Jun. 14, 2018    (NL) ...................................... 1042822

(51) Int. Cl.
*A01G 27/00*    (2006.01)
*A01G 9/029*    (2018.01)

(52) U.S. Cl.
CPC ......... *A01G 27/008* (2013.01); *A01G 9/0293* (2018.02)

(58) Field of Classification Search
CPC .. A01G 27/008; A01G 27/005; A01G 27/006; A01G 27/02; A01G 31/00;
(Continued)

(56) References Cited

U.S. PATENT DOCUMENTS

| | | | | |
|---|---|---|---|---|
| 774,988 A | * | 11/1904 | Maurer | A01G 27/02 47/79 |
| 3,274,730 A | * | 9/1966 | Bose | A01G 31/02 47/1.01 R |

(Continued)

FOREIGN PATENT DOCUMENTS

| | | | | |
|---|---|---|---|---|
| CH | 700639 A1 | * | 9/2010 | ........... A01G 27/005 |
| CN | 101141875 A | * | 3/2008 | ........... A01G 27/006 |

(Continued)

*Primary Examiner* — Peter M Poon
*Assistant Examiner* — Carly W. Lynch
(74) *Attorney, Agent, or Firm* — N.V. Nederlandsch Octrooibureau

(57) ABSTRACT

A cultivation system for cultivating plants from e.g. seeds, seedlings, cuttings, etc. arranged in or onto substrate plugs (2), comprising a cultivation pot (1) having a bottom wall (4a), a side wall (4b) and filling channel (5) extending upwards from the bottom and/or side wall (4a 4b). Further comprising a filling module (6) provided with a filling connection (7) which is configured to cooperate with the filling channel (5) of the cultivation pot (1) for supplying the cultivation pot (1) with water. The cultivation system further comprises means for measuring the actual quantity of water or the actual water level in the cultivation pot (1), allowing control of the amount of water being supplied.

13 Claims, 4 Drawing Sheets

(58) Field of Classification Search
CPC ........ A01G 31/02; A01G 27/00; A01G 25/16; A01G 25/167; A01G 9/247
See application file for complete search history.

(56) References Cited

U.S. PATENT DOCUMENTS

| | | | |
|---|---|---|---|
| 9,516,821 B1* | 12/2016 | Conrad, Jr. | A01G 27/005 |
| 11,096,349 B2* | 8/2021 | Leo | A01G 9/18 |
| 2002/0020111 A1* | 2/2002 | Rosenberg | A01G 27/006 47/79 |
| 2006/0207175 A1* | 9/2006 | Wu | A01G 27/02 47/79 |
| 2007/0267515 A1* | 11/2007 | Sargent | A01G 27/006 239/69 |
| 2008/0134576 A1* | 6/2008 | Merryweather | A01G 27/006 47/1.01 R |
| 2012/0066971 A1* | 3/2012 | Lin | A01G 27/02 47/80 |
| 2017/0188528 A1 | 7/2017 | Gordon | |
| 2018/0368343 A1* | 12/2018 | O'Rourke | C10L 1/04 |

FOREIGN PATENT DOCUMENTS

| | | | | |
|---|---|---|---|---|
| CN | 203708968 U | | 7/2014 | |
| CN | 104429875 A | * | 3/2015 | ........... A01G 27/001 |
| CN | 105052714 A | * | 11/2015 | ........... A01G 27/001 |
| CN | 104172819 B | * | 9/2016 | ............. A01G 25/02 |
| CN | 104172819 B | | 9/2016 | |
| CN | 106212223 A | * | 12/2016 | ........... A01G 25/02 |
| CN | 109463174 A | * | 3/2019 | ........... A01C 23/023 |
| JP | H06250006 A | | 9/1994 | |
| JP | 2017507666 A | | 3/2017 | |
| NL | 1040151 A | * | 10/2014 | ............... A01G 9/08 |
| WO | WO-2013093083 A1 | * | 6/2013 | ............. A01G 31/00 |
| WO | 2017/163056 A1 | | 9/2017 | |
| WO | WO-2017163056 A1 | * | 9/2017 | ........... A01G 27/001 |

\* cited by examiner

CULTIVATION SYSTEM FOR CULTIVATING PLANTS

FIELD OF THE INVENTION

The invention relates to a cultivation system for cultivating plants from e.g. seed, seedlings, cuttings, etc., arranged in or on substrate plugs at the top of the cultivation pots, in cultivation pots which are part of or are associated with the cultivation system.

BACKGROUND ART

Such a cultivation system is generally known.

Chinese patent publication CN 2722605 Y discloses a water-saving water storage type flower pot, wherein one or a plurality of tubes are arranged within the pot and extend upward from a hole in the bottom of the pot such that water can be stored therein. The one or the plurality of tubes allow watering of the flower pot through capillary principles.

Chinese patent publication CN 203708968 U discloses a device for automatically watering a flower in a flower pot. The device comprises a water storage device and a water delivery pipe formed by a main pipe and a branch pipe. An upper end of the branch pipe is inserted upward into a flower pot from the bottom thereof, wherein the depth of insertion determines a moisturizing position in the flower pot.

US patent publication US 2017/0188528 A1 discloses a self-watering planter device having an integral internal irrigation system, wherein distribution channels are provided that extend upward from a bottom end of the planter device and wherein the distribution channels have outer outlet orifices that are positioned within the planter device.

US patent application US 2016/183488 A1 discloses a hydroponic cultivation apparatus which stores a nutrient synthesized in an above-ground part into an underground part, and is configured to water the underground part.

SUMMARY OF THE INVENTION

The present invention aims to provide a cultivation system of the above-mentioned type, provided with or comprising means for bringing up to standard the level of water in the cultivation pots used.

To that end, according to the invention, there is provided a cultivation system of the above-mentioned type, wherein the cultivation pots are each provided with a filling channel extending vertically upwards from a bottom and/or side wall, the filling channel being arranged to cooperate with a filling module which is part of or cooperates with the cultivation system, and which has one or more filling connections, each of which are arranged to connect to the filling channel for supplying the associated cultivation pot with sufficient water.

The cultivation system comprises means for measuring the actual quantity of water or the actual water level in each associated cultivation pot and for additional filling with water in dependence thereof.

In particular, according to the present invention, the cultivation system comprises or utilizes at least one cultivation pot having a bottom wall, a (circumferential) side wall and a filling channel that extends upwards from the bottom and/or side wall. The cultivation system further comprises a filling module provided with at least one filling connection which is configured to cooperate/engage with the filling channel of the at least one cultivation pot for supplying the at least one cultivation pot with water. The cultivation system comprises means for measuring an actual quantity/amount of water and/or an actual water level in the at least one cultivation pot allowing control of the amount of water being supplied thereto.

Note that the cultivation system of the present invention may comprise any plurality of cultivation pots, wherein each cultivation pot has a bottom wall, a (circumferential) side wall and a filling channel that extends upwards from the bottom and/or side wall. The cultivation system then comprises a filling module provided with a (corresponding) plurality of filling connections each of which is configured to cooperate/engage with a filling channel of a cultivation pot of the plurality of cultivation pots for supplying water thereto. The cultivation system then comprises means for measuring an actual quantity/amount of water and/or an actual water level in each cultivation pot allowing control of the amount of water being supplied to each cultivation pot.

The cultivation system according to the invention may also comprise means which are arranged to provide that the water level does not fall below a minimum level and does not exceed a maximum level, for the germination and/or further development of the seed etc. in the associated cultivation pot.

The present invention also comprises a cultivation pot which is arranged to form part of, or at least to cooperate with, a cultivation system according to the invention as indicated above, which cultivation pot comprises a filling channel extending vertically upwards from a bottom and/or side wall, and arranged to be able to cooperate with the one or more filling connections of a filling module of the cultivation system in order to be able to provide the cultivation pot with sufficient water.

SHORT DESCRIPTION OF DRAWINGS

The present invention will now be further discussed with reference to the figure description below, in which FIG. 1a shows an embodiment of a cultivation pot of a cultivation system according to the present invention;

Figure 3B:
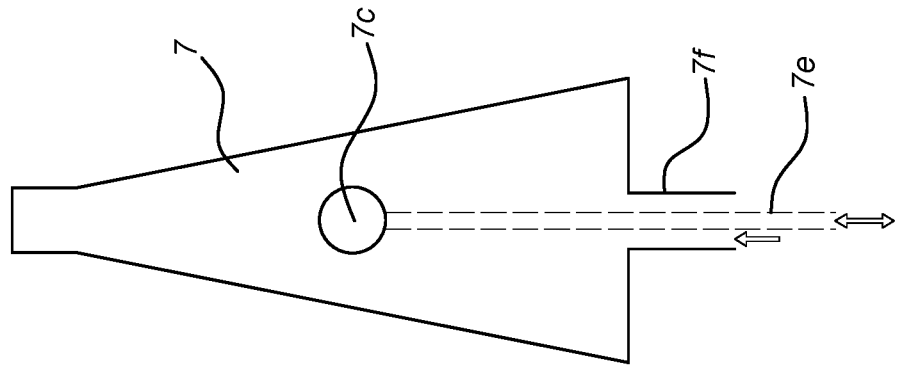
Figure 3A:
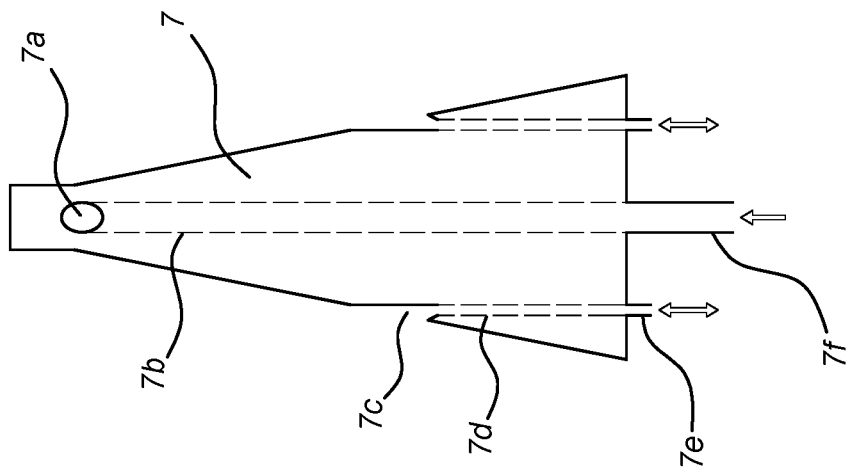
Figure 4:
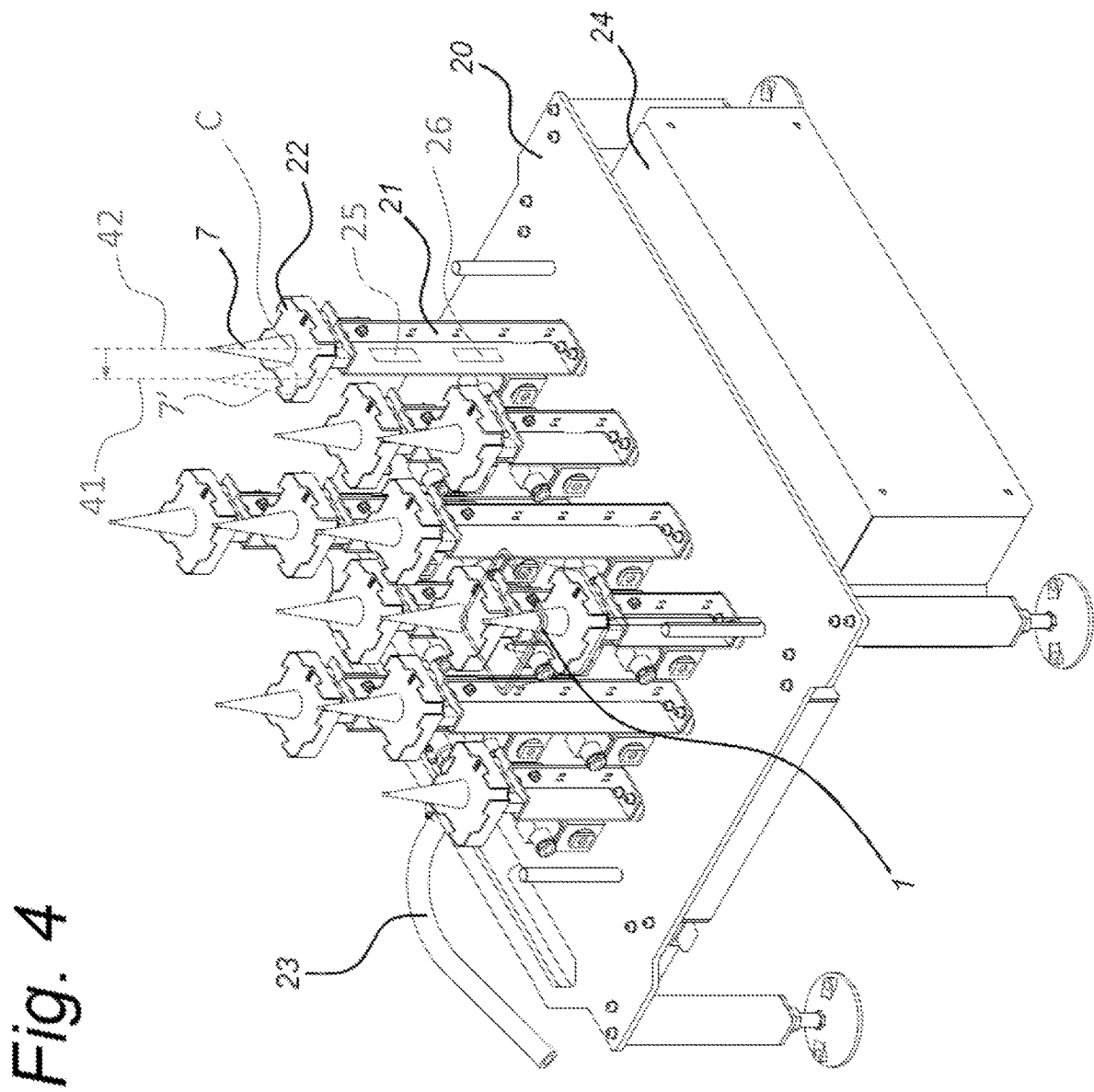

FIGS. 3a and 3b each show an embodiment of a filling connection with a suction opening according to the present invention; and wherein FIG. 4 shows an embodiment of a support table according to the present invention.

DESCRIPTION OF EMBODIMENTS

Figure 1A:
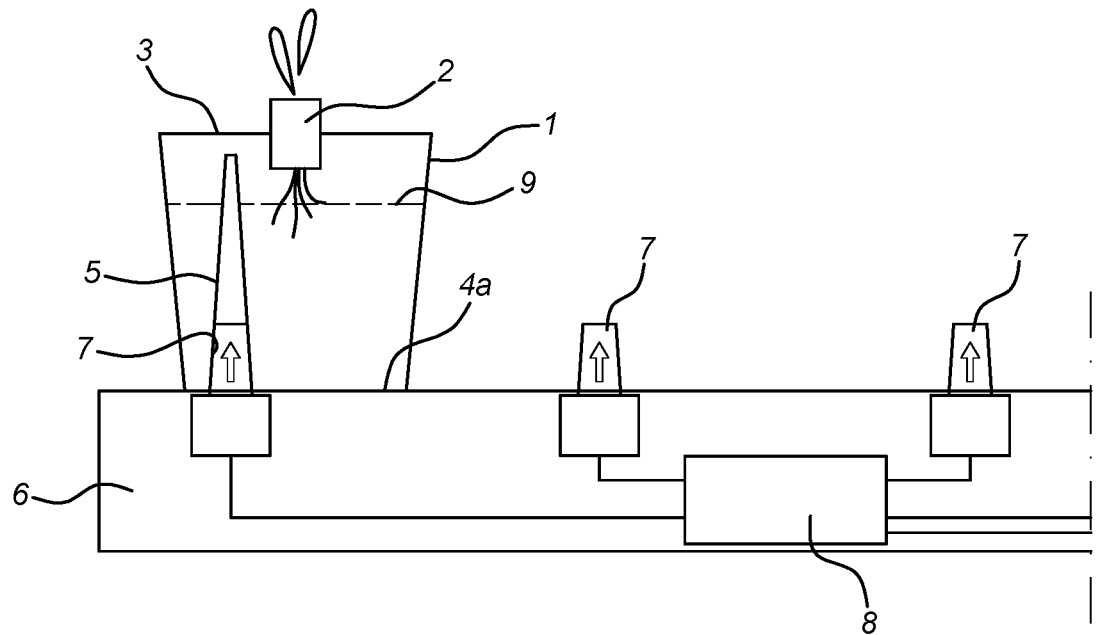
FIG. 1b shows an alternative embodiment of a cultivation pot of a cultivation system according to the present invention.
Figure 1B:
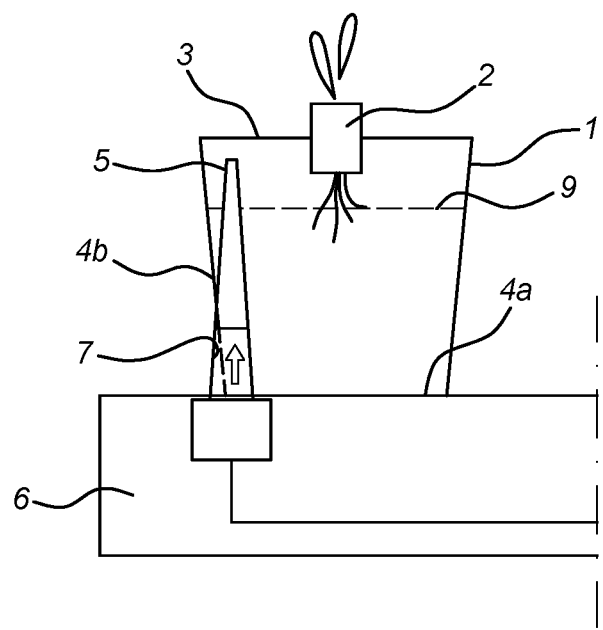

FIGS. 1a and 1b both show an exemplary embodiment of a cultivation system for cultivating plants from, for example, seed, seedlings, cuttings, etc., arranged in or on substrate plugs 2 in cultivation pots 1 belonging to, or at least cooperating with, the cultivation system (see for example http://www.bvb-substrates.nl/nieuwe-toepassing-bvb-sublime/) at the top of the cultivation pots, which are for example placed in lids 3 or foil applied to the cultivation pots.

The cultivation pots 1 are each provided with a filling channel 5 extending vertically upwards from a bottom wall 4a (see FIG. 1a) and/or side wall 4b (see FIG. 1b), so as to cooperate with a filling module 6 belonging to the cultivation system or at least co-operating therewith, comprising a number of vertically upwardly extending filling connections 7, each of which is adapted to contact with the filling channel 5 of cultivation pots 1 in order to provide the associated cultivation pot 1 with water.

According to the present invention there is no intrinsic limit to the number of cultivation pots 1 utilized, so that the cultivation system comprises at least one cultivation pot 1 having a bottom wall 4a, a (circumferential) side wall 4b and a filling channel 5 that extends upwards from the bottom and/or side wall 4a, 4b. The cultivation system then comprises a filling module 6 provided with at least one filling connection 7 which is configured to cooperate/engage with the filling channel 5 of the at least one cultivation pot 1 for supplying water thereto. Therefore, given one or more cultivation pots 1, the filling module 6 comprises a corresponding one or more filling connections 7 each of which is configured to engage with the filling channel 5 of one of the one or more cultivation pots 1.

The cultivation system shown comprises means, for instance a water supply control module 8, which ensures that the cultivation pots 1 are filled to such a level 9 that there is sufficient water for the plant for a certain period of time. The cultivation system comprises, for example, sensors for measuring the actual amount of water (for example by weight measurement, e.g. weight sensors) or the actual water level 9 (for example by optical sensors) in each associated cultivation pot 1, and for supplying a quantity of water to each cultivation pot 1 in dependence thereof. Thus, several cultivation pots 1 can be provided with a sufficient quantity of water at the same time.

The filling channel 5 extends upwards and has a substantial length which is such that if the cultivation pots 1 are removed after filling with water from the filling module 6, the water cannot flow away via the filling channel 5. Due to the large length of the filling channel 5, an amount of water remains in the cultivation pot 1 such that the plant to be grown in the plug 2 has sufficient water for a longer period of time. Because the plant roots develop in length while the water level drops, the plant will thus have sufficient water for a longer period of time, for example a week.

FIG. 1a shows an exemplary embodiment of a cultivation system in which the cultivation pots 1 are each provided with a filling channel 5 extending vertically upwards from the bottom wall 4a, arranged to cooperate with the filling module 6 comprising a number of vertically upwardly extending filling connections 7, each arranged to make contact with the filling channel 5 of the cultivation pots 1 in order to be able to provide them with water. As depicted, water is provided through the filling connection 7 and through the filling channel 5, wherein the filling channel 5 comprises an upper opening extending above the water level 9. As is readily understood that each filling connection 7 and each filling channel 5 comprises a passageway through which water can flow. So when a filling connection 7 is in engagement with a filling channel 5 of a cultivation pot 1, then the passageways of the filling connection 7 and the filling channel 5 are fluidly connected.

In an embodiment, as depicted in FIG. 1a, each of the filling connections 7 comprises a tapered upper part for congruent engagement within a tapered lower part of the filling channel 5. This embodiment allows for good leak free sealing between the filling connection 7 and the filling channel 5, so that water may be pushed upwards in leak free fashion and through the upper opening of filling channel 5 into the cultivation pot 1. The tapered upper part and tapered lower part of the filling connection 7 and the filling channel 5, respectively, also provide improved alignment, such as improved alignment of the aforementioned passageways.

In an advantageous embodiment, the tapered upper part of each filling connection 7 and the tapered lower part of each filling channel 5 are conical shaped such that further sealing is provided and alignment is improved, e.g. alignment of the aforementioned passageways through the filling connection 7 and filling channel 5.

An important advantage of having the above mentioned tapered/conical upper part and tapered/conical lower part for a filling connection 7 and a filling channel 5, respectively, is that bacterial and/or algae contamination of water in a cultivation pot 1 is reduced.

FIG. 1b shows an exemplary embodiment of a cultivation system in which the cultivation pots 1 are each provided with a filling channel 5 extending vertically upwards partly from the bottom wall 4a and partly from the side wall 4b, arranged to cooperate with the filling module 6 which has a number of vertical upwardly extending filling connections 7, each adapted to be able to contact with the filling channel 5 of the cultivation pots 1 in order to be able to provide them with water. In this embodiment, in which the filling channel 5 extends vertically upwardly (partially) from the (obliquely extending) side wall 4b, the filling connections 7 are for that reason longer in order to obtain sufficient sealing with the filling channel 5.

From FIGS. 1a and 1b it follows that in an advantageous embodiment the filling channel 5 of a cultivation pot 1 may be offset from the centre/middle of the cultivation pot 1. This allows the plug 2 to be provided in the centre/middle of the cultivation pot 1 for providing maximum space around the plug 2 for cultivating a plant, particularly maximizing space for plant roots to grow in the water. So by offsetting the filling channel 5, obstruction to plant growth in the cultivation pot 1 is minimized.

Furthermore, by offsetting the filling channel 5 allows for better use of space, so that plant growth in width direction rather than height or in upward direction is facilitated. Lettuce, for instance, grows much more in width rather than height and as such having an offset filling channel 5 allows lettuce to symmetrically expand in all directions without interference with the offset filling channel 5. A plant such as Basil, on the other, grows much more in height rather than width and so a more centrally located filling channel 5 need not interfere with the growth cycle of Basil.

So by positioning the filling channel 5 in offset fashion with respect to the cultivation pot 1, a cultivation pot area can be utilized more efficiently for plant varieties that grow in width rather than height. In both embodiments it is ensured that the cultivation pots 1 can be provided with water from below, from the filling module 6, wherein the water flows into the top of the cultivation pot 1 (see FIGS. 1a and 1b) via the high positioned outlet opening of the filling channel 5. In addition, it is achieved that the cultivation pots 1 can simply be connected to the filling connections 7 by placing them (from above) onto the filling module 6, and can then be removed from the filling connections 7 again by simply moving the cultivation pots upwards. It should be clear that in this manner (if desired) several cultivation pots can be connected simultaneously (for example per complete tray) to the filling module 6 and can be removed again simultaneously thereafter without having to connect and later disconnect the water connections in a separate operation/movement.

In an advantageous embodiment, each cultivation pot 1 may be provided with a perforated foil 3 configured for covering the cultivation pot 1 when in use. In this embodiment the perforated foil 3 covers the cultivation pot 1 but does allow for air to escape when water flows into the cultivation pot 1 as the volume above the water level 9 decreases when the water level 9 rises. The perforated foil 3 also improves exchange of oxygen to the cultivation pot 1 and in particular the water contained therein for optimized growth. In a further embodiment, the perforated foil 3 comprises perforations between 80 to 100 microns in size, allowing for further improved air and oxygen exchange.

In an advantageous embodiment, the cultivation pots 1 are transparent, i.e. made of transparent material, so that the growth of roots in the water can be checked and/or water discoloration can be checked, wherein water discoloration could be indicative of unwanted algae growth. In an alternative embodiment, the cultivation pots 1 are made of a non-transparent material, e.g. a white or coloured material, possibly translucent material. In case of such a non-transparent material, algae growth will be hindered, minimized, or even completely prevented.

Figure 2:
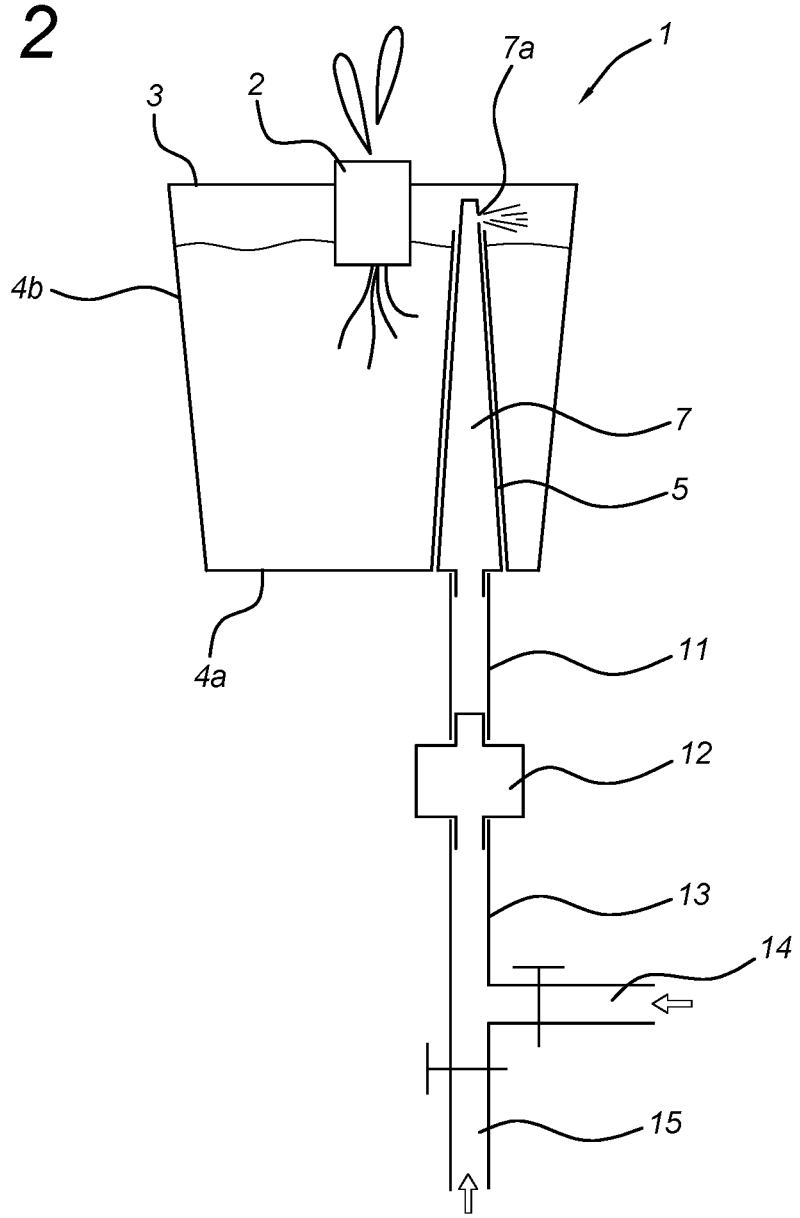
FIG. 2 shows a filling connection according to an embodiment of the present invention.

FIG. 2 shows a filling connection 7 according to an embodiment of the present invention. In the embodiment shown, each filling connection 7 has a tapered shape along its entire length for congruent engagement within a tapered shape along the entire length of the filling channel 5. So in contrast to the embodiments of FIG. 1a, 1b, a tapered shape is provided to the entire length/height of the filling connection 7 and a tapered shape is provide to the entire length/height of the filling channel 5. Further, each filling connection 7 comprises an upper water orifice 7a configured to extend beyond an top opening of the filling channel 5 when the filling connection 7 extends through the filling channel 5 of the cultivation pot 1 when in use. So when the filling connection 7 is fully received within the filling channel 5, the upper water orifice 7a extend beyond the upper opening of the filling channel 5. This embodiment provides a distinct advantage in that cross contamination between cultivation pots 1 is reduced as the filling connection 7 does not come into contact with water contained in a cultivation pot 1. So in case the filling connection 7 is withdrawn from a filling channel 5 of a first cultivation pot, and subsequently inserted into a filling channel 5 of a second cultivation pot, then cross contamination from water contained in the first cultivation pot 1 to water contained in the second cultivation pot will not occur.

Another advantage of this embodiment is that leakage between the filling connection 7 and the filling channel 5 is reduced as there is a direct flow through the passageway that completely extends through the filling connection 7 toward the upper water orifice 7a.

In an advantageous embodiment, the upper water orifice 7a of each filling connection 7 is arranged in a side face thereof. In this embodiment water is being supplied in sideways fashion into the cultivation pot 1, so that it is possible to direct the supplied water through the upper water orifice 7a away from the plug 2, e.g. away from plant roots to avoid damage thereof. This may be achieved by directing the upper water orifice 7a toward the side wall 4b of the cultivation pot 1, which would also minimize splatter. Note that the upper water orifice 7a may also be directed toward a corner of e.g. a rectangular/square cultivation pot 1, so that damage to the plant or roots thereof is prevented and splatter is reduced.

As further shown in FIG. 2, in an embodiment the filling module 6 may further comprise a (bacterial, viral, etc.) filter 12 for each filling connection 7, and wherein the filter 12 is arranged upstream from the filling connection 7. In this embodiment the filter 12 prevents bacterial contamination from a water source 15 of the filling module 6, as water supplied by the water source 15 must first pass through the filter 12 before entering the filling connection 7 toward the cultivation pot 1.

Further or alternative anti-contamination measures can be envisaged. In an exemplary embodiment, the filling module 6 may comprises a steam source 14 for each filling connection 7 and wherein the steam source 14 is arranged upstream from the filling connection 7. By forcing steam through the filling connection 7, the passageway extending there through can be sterilized/decontaminated.

It is even possible to combine the filter 12 and the steam source 14 to provide further decontamination of water supplied to the cultivation pots 1. For example, in an embodiment, the filling module 6 may comprise a filter 12 and a steam source 14 for each filling connection 7, wherein the filter 12 is arranged upstream from the filling connection 7 and wherein the steam source 14 may be arranged upstream from the filter 12. In this embodiment the steam source 14 allows for sterilisation of the filter 12 as well as the filling connection 7.

As further depicted in FIG. 2, the water source 15 and steam source 14 may be connected to a main supply tube 11 which is in turn connected to the filling connection 7, wherein the supply of steam from the steam source 14 and the supply of water from the water source 15 may be controlled through an appropriate valve arrangement. In an embodiment, the (bacterial) filter 12 may be connected to the main supply tube 11 upstream therefrom, and wherein the steam source 14 and water source 15 may be connected to a filter supply tube 13 connected to the (bacterial) filter 12 upstream therefrom.

With regard to the engagement between the filling connection 7 and the filling channel 5 of a cultivation pot 1, FIGS. 3a and 3b each show a further embodiment of a filling connection 7 according to the present invention. In the embodiment shown, each filling connection 7 may comprise one or more suction openings 7c configured for suction engagement with an inner wall of the filling channel 5. In this embodiment the filling connection 7 may be fully inserted into the filling channel 5 such that the one or more suction openings 7c engage the inner wall of the filling channel 5. Then by providing a vacuum or negative pressure at the suction openings 7c, the filling channel 5 and filling connection 7 can be forced into snug and tight engagement as a result of which an improved leak feel seal is provided between the filling channel 5 and filling connection 7. Also, through suction the cultivation pots 1 are sufficiently secured to the filling connection 7.

In case the filling connecting 7 and the filling channel 5 each comprise a tapered or conical shape for congruent engagement, then through suction provided at the one or more suction openings 7c the filling connection 7 is forced further into the filling channel 5 up to a maximum depth, thereby further facilitating a snug and fluid tight seal between the filling channel 5 and filling connection 7.

In FIGS. 3a and 3b it is further shown that the filling connection 7 comprises the aforementioned passageway 7b connected to the upper water orifice 7a for supplying water to the cultivation pot 1. The passageway 7b is then connected to the water source 15 by means of the connection inlet 7f of the filling connection 7. The one or more suction openings 7c may be connected to secondary passageways 7d extending through the filling connection 7, and wherein the secondary passageways 7d may then be connected to suction inlets 7e of the filling connection 7. In turn, the suction inlets 7e are connected to a vacuum or negative pressure source (not shown).

Note, however, that in an embodiment the suction inlets 7e may also be connected to a combined positive pressure source and vacuum/negative pressure source, so that the one or more suction openings 7c may be used for providing a vacuum/negative pressure or a positive pressure. Here, the positive pressure may facilitate disconnecting the filling connection 7 from the filling channel 5 by separating them through a positive pressure at the one or more suction outlets 7c.

In an embodiment, the one or more suction openings 7c of each filling connection 7 may be arranged substantially along a mid-section thereof. As shown in FIGS. 3a and 3b, the one or more suction openings 7c may be arranged substantially midway/halfway the length of the filling connection 7, so that parts of the filling connection 7 below and above the one or more suction openings 7c experience a similar vacuum/negative or positive pressure between the inner wall of the filling channel 5 and the filling connection 7. Note that in an embodiment the one or more suction openings 7c are arranged in a side face/surface of the filling connection 7, wherein, in a further embodiment, the side face/surface may be a tapered surface, e.g. a conical surface.

With regard to managing and handling a cultivation pot 1 and bringing it into engagement with a filling connection 7, FIG. 4 shows an embodiment of a support table 20 according to the present invention. In the embodiment shown, the cultivation system may comprise a support table 20 provided with at least one upward extending support post 21 comprising an upper end having a filling connection 7 attached thereto. In this embodiment, the support post 21 allows a cultivation pot 1 to be positioned on a filling connection 7 away from the support table 20, so that the cultivation pot 1 can be handled by an automated pick-and-place system more easily as there is less interference from the support table 20. In an embodiment, an automated pick-and-place system may be an automated crate system, wherein a crate is used to lower and lift the cultivation pot 1 to and away from the support table 20, i.e. the filling connection 7.

In an embodiment, the upper end of the support post 21 may comprise a support base 22 arranged (directly) below the filling connection 7, e.g. at the connection inlet 7f, wherein the support base 22 is configured to support the cultivation pot 1 when in use. In this embodiment the cultivation pot 1 rests on the support base 22, which may then determine the insertion depth of the filling connection 7 into the filling channel 5 of the cultivation pot 1.

In an embodiment, the filling connection 7 may be arranged offset from a centre point "C" of the support base 22, e.g., see the offset filling connection 7' with respect to the centre point "C" as depicted by offset axes 41 and 42, thereby allowing for a cultivation pot 1 which is provided with a filling channel 5 offset from the centre/middle of the cultivation pot 1. This embodiment allows full support of the bottom wall 4a of the cultivation pot 1 whilst allowing offset placement of the filling channel 5.

In a further embodiment, the support post 21 may be provided with a weight sensor 25 and/or optical sensor 26 configured to determine the water weight and/or water level 9, respectively, in a cultivation pot 1 when in use. In an embodiment, the weight and/or optical sensor may be arranged on the support base 22. This allows close monitoring of the amount of water in the cultivation pot 1 and based on the measurements the supply of water can be controlled.

FIG. 4 also shows how the support table 20 allows managing and handling of a plurality of cultivation pots 1. As shown, the cultivation system may comprise the support table 20 which is then provided with an array arrangement of at least two upward extending spaced apart support posts 21 each of which comprises an upper end having a filling connection 7 attached thereto. The at least two support posts 21 then have different heights with respect to the support table 20. In this embodiment the two spaced apart support posts 21 have different heights so that interference between plants of two adjacent cultivation pots 1 is prevented. This improves growth and prevents tangling of adjacent plants which would make placement and/or removal of the at least two cultivation pots 1 difficult.

In an embodiment, the upper end of each of the at least two support posts 21 may comprise a support base 22 which is arranged (directly) below the filling connection 7, e.g. at the connection inlet 7f, wherein each support base 22 is configured to support a cultivation pot 1 when in use. In this embodiment each cultivation pot 1 is positioned on a respective support base 22 when in use, so that each support base 22 determines the insertion depth of the filling connection 7 into the filling channel 5 of the cultivation pot 1 supported on the respective support base 22.

For utilizing cultivation pots 1 that are provided with a filling channel 5 offset from the centre/middle of the cultivation pot 1, an embodiment is provided wherein each filling connection 7 is arranged offset from a centre point of the support base 22, which is arranged (directly) below the filling connection 7, e.g. at the connection inlet 7f. This allows full support of the bottom wall 4a of the cultivation pot 1 whilst allowing offset placement of the fillings channel 5. As mentioned earlier, providing an offset filling channel 5 to a cultivation pot 1 allows for efficient use of the cultivation pot 1 for plant varieties that tend to grow much more in width rather than height. By arranging each filling connection 7 offset from the centre point of the support base 22 allows for offset placement of each filling channel 5 whilst providing stable support to the cultivation pot 1. In an advantageous embodiment, each support post 21 is provided with a weight sensor 25 and/or optical sensor 26 configured to determine a water weight and/or a water level, respectively, in the cultivation pot 1 supported on the support post 21 when in use. This allows close monitoring of the amount of water in the cultivation pots 1, so that based on the measurements the supply of water can be controlled. Note that the weight sensor and/or optical sensor may be arranged on the support base 22 in a further embodiment. For example, in an embodiment a weight sensor may be arranged directly underneath the support base 22 for measuring the weight of a cultivation pot 1 positioned on the support base 22. It is also conceivable that in an alternative embodiment the weight sensor is arranged directly on top of the support base 22 and configured to directly engage a cultivation pot 1.

It is further noted that e.g. the speed of plant growth and/or the size of plants grown may be different between cultivation pots 1. Consequently, by utilizing weight sensors and/or optical sensors as mentioned above allows that the supply of water can be accurately controlled for each cultivation pot 1 individually according to the needs of a plant cultivated therein.

As is readily seen in FIG. 4 that the support table 20 may be provided with an array arrangement of any plurality of upward extending spaced apart support posts 21, each of which comprises an upper end having a filling connection 7 attached thereto. By differentiating adjacent support posts 21 by different heights with respect to the support table 20, the array arrangement forms a staggered/alternating arrangement of spaced apart support posts 21 with respect to height.

In this way any plurality of cultivation pots 1 can be used whilst preventing interference between the plants grown therein. Such a staggered/alternating arrangement of cultivation pots 1 at different heights also facilitates automated removal and placement of the cultivation pots 1.

For example, in FIG. 4 a (square) staggered/alternating arrangement of spaced apart support posts 21 is depicted based on two different heights. Using an automated crate positioning system it is possible to first remove cultivation pots 1 at the highest position with respect to the support table 20. This would yield a crate carrying a "checkerboard pattern" of spaced apart cultivation pots 1, allowing further growth of the plants kept in the cultivation pots 1 as there is more space for growth there between. Another crate may then be used to remove the cultivation pots 1 at the lowest position with respect the support table 20. This also yields a crate carrying a "checkerboard pattern" of spaced apart cultivation pots 1 to enable further growth of the plants kept therein.

Finally, FIG. 4 further shows that the support table 20 may be connected to a water source by means of a hose or tube 23, and wherein the support table 20 may be provided with an electronic module 24 for e.g. connection to weight and/or optical sensors, water and/or steam valves etc.

The present invention has been described above with reference to a number of exemplary embodiments as shown in the drawings. Modifications and alternative implementations of some parts or elements are possible, and are included in the scope of protection as defined in the appended claims.

The invention claimed is:

1. A cultivation system for cultivating plants from seeds, seedlings, and/or cuttings arranged in or onto substrate plugs, comprising:
    a plurality of cultivation pots, wherein each cultivation pot of the plurality of cultivation pots is provided with a filling channel extending upwards from a bottom and/or a side wall of the cultivation pot,
    a filling module provided with one or more filling connections, wherein each filling connection is arranged for being removably received in the filling channel of each cultivation pot for supplying the associated cultivation pot with water,
    wherein each filling connection does not come into contact with the water contained in any of the plurality of cultivation pots,
    wherein each filling channel and each filling connection comprises a passageway through which water can flow, and wherein each filling connection comprises one or more suction openings each of which is arranged substantially halfway along a length of the filling connection for engaging an inner wall of the filling channel of each cultivation pot and securing the filling connection to the filling channel when a negative pressure is applied to the one or more suction openings of the filling connection,
    further comprising means for measuring an actual quantity of water or an actual water level in each associated cultivation pot and for additional filling of water in dependence thereon.

2. The cultivation system according to claim 1, wherein each of the filling connections comprises a tapered upper part for congruent engagement within a tapered lower part of the filling channel.

3. The cultivation system according to claim 1, wherein each of the filling connections has a tapered shape along its entire length for congruent engagement within a tapered shape along the entire length of the filling channel,
    wherein each filling connection comprises an upper water orifice configured to extend beyond an upper opening of the filling channel when the filling connection extends through the filling channel.

4. The cultivation system according to claim 3, wherein the upper water orifice of each filling connection is arranged in a side face thereof.

5. The cultivation system according to claim 1, wherein the filling module further comprises a filter for each filling connection, and wherein the filter is arranged upstream from the filling connection.

6. The cultivation system according to claim 1, wherein the filling module further comprises a steam source for each filling connection.

7. The cultivation system according claim 6, wherein the filling module further comprises a filter for each filling connection, and wherein the filter is arranged upstream from the filling connection and wherein the steam source is arranged upstream from the filter.

8. The cultivation system according to claim 1, further comprising a support table provided with an array arrangement of at least two upward extending spaced apart support posts each of which comprises an upper end having the filling connection attached thereto, wherein the at least two support posts have different heights with respect the support table.

9. The cultivation system according to claim 8, wherein the upper end of each support post comprises a support base arranged below the filling connection, wherein the support base is configured to support a cultivation pot of the plurality of cultivation pots when in use.

10. The cultivation system according to claim 9, wherein each filling connection is arranged offset from a centre point of the support base which is arranged below the filling connection.

11. The cultivation system according to claim 8, wherein each support post is provided with a weight sensor or optical sensor configured to determine water weight or water level, respectively, in a cultivation pot of the plurality of cultivation pots when in use.

12. The cultivation system according to claim 1, wherein each of the cultivation pots are provided with a perforated foil configured for covering the cultivation pot when in use.

13. The cultivation system according to claim 1, wherein the plurality of cultivation pots are transparent.

* * * * *